United States Patent
Nordenfelt et al.

(10) Patent No.: US 7,589,313 B2
(45) Date of Patent: Sep. 15, 2009

(54) METHOD AND APPARATUS FOR ABSOLUTE OPTICAL ENCODERS WITH REDUCED SENSITIVITY TO SCALE OR DISK MOUNTING ERRORS

(75) Inventors: Mikael Nordenfelt, Täby (SE); Mikael Hertzman, Sollentuna (SE); Staffan Palm, Solna (SE); Magnus Westermark, Bandhagen (SE)

(73) Assignee: Trimble AB, Danderyd (SE)

( * ) Notice: Subject to any disclaimer, the term of this patent is extended or adjusted under 35 U.S.C. 154(b) by 0 days.

(21) Appl. No.: 10/554,027

(22) PCT Filed: Apr. 21, 2004

(86) PCT No.: PCT/SE2004/000607

§ 371 (c)(1),
(2), (4) Date: Oct. 21, 2005

(87) PCT Pub. No.: WO2004/094957

PCT Pub. Date: Nov. 4, 2004

(65) Prior Publication Data

US 2006/0243895 A1    Nov. 2, 2006

(30) Foreign Application Priority Data

Apr. 22, 2003 (SE) .................................. 0301164

(51) Int. Cl.
*G01D 5/34* (2006.01)
(52) U.S. Cl. .............................. 250/231.13; 250/231.18
(58) Field of Classification Search .................. 250/231.13–231.19; 33/1 PT; 341/11, 13
See application file for complete search history.

(56) References Cited

U.S. PATENT DOCUMENTS 3,549,897 A * 12/1970 Blake ..................... 250/231.16

(Continued)

FOREIGN PATENT DOCUMENTS

EP    0765039 A2    3/1997

(Continued)

OTHER PUBLICATIONS

Engelhardt, Kai et al. "High-resolution optical encoder with large mounting tolerances", *Applied Optics*, vol. 36, No. 13, May 1, 1997.

*Primary Examiner*—Thanh X Luu
(74) *Attorney, Agent, or Firm*—Harness, Dickey & Pierce, P.L.C.

(57) ABSTRACT

An absolute optical encoder apparatus for measuring an absolute position comprises an optical disk or scale element (100) having both incremental and absolute code tracks formed thereon. In the embodiment, a photoemitter light source (110, 111) illuminates the tracks onto a CCD area array sensor (115, 116) such that an image is formed from a pixel matrix having of rows and columns. Two detector line rows (410, 420) of the pixel matrix are each read out from the portion of the matrix comprising the incremental and absolute code tracks respectively. Inaccurate mounting of the disk or scale element can cause fluctuations in the period of the code tracks resulting from the rotation of the disk or movement of the scale element. The mounting inaccuracies are compensated for either by matching the spatial frequency by dynamically changing row of detector line read from the incremental image of the code track or by altering the numerical value of the pattern period used in the Fourier phase algorithm. The absolute position is numerically calculated from the imaged code tracks.

23 Claims, 7 Drawing Sheets

U.S. PATENT DOCUMENTS

| | | | |
|---|---|---|---|
| 4,714,339 A * | 12/1987 | Lau et al. | 356/4.09 |
| 5,196,900 A | 3/1993 | Pettersen | |
| 5,235,181 A | 8/1993 | Durana et al. | |
| 5,965,879 A | 10/1999 | Leviton | |
| 6,333,511 B1 | 12/2001 | Talmi | |
| 7,060,968 B1 * | 6/2006 | Leviton | 250/231.13 |

FOREIGN PATENT DOCUMENTS

| | | |
|---|---|---|
| GB | 2126444 A | 3/1984 |
| JP | 2000 234941 | 8/2000 |

* cited by examiner

US 7,589,313 B2

METHOD AND APPARATUS FOR ABSOLUTE OPTICAL ENCODERS WITH REDUCED SENSITIVITY TO SCALE OR DISK MOUNTING ERRORS

FIELD OF THE INVENTION

The present invention relates generally to absolute optical encoders and, more particularly, to a high resolution encoding method and apparatus having adaptive compensation for reducing sensitivity to scale or disk mounting errors.

BACKGROUND OF THE INVENTION

Optical encoders are electromechanical devices used typically for measuring position or monitoring motion and controlling the position with high precision. They are widely used in applications where extremely accurate linear or angular positioning information is required such as in computer-controlled manufacturing, factory automation, or land surveying equipment. Rotary optical encoders sense angular position by detecting laser light interrupted by markings making up coded tracks embedded on a disk. The disk rotates in sync with the movement being monitored. Rotary encoders are generally classified in either one of two categories i.e. as Absolute or Incremental encoders. Absolute encoders read a distinct coded track on the disk in order to determine a unique position and thus have the advantage of being able to determine the absolute position after a power failure without having to return to a "home" or index position. Incremental encoders can detect only relative position thus the position count can be "lost" in the event of a power failure or by severe jarring resulting in inadvertent disk movement. The advantage of being able to obtain the absolute position at any time makes absolute encoders desirable for many applications.

Advances in computer automated manufacturing technology require improvements in positioning precision to save space, cost and time. Naturally, the demand for high-resolution encoders capable of providing even finer incremental linear or rotary motion is greater still. Attempts at developing high-resolution encoders have been described in the prior art. Included in these are rotary encoders that are able to measure both the absolute and incremental angular position simultaneously from separate tracks embedded on a glass disk. The tracks correspond to an absolute track and an incremental track that are read cooperatively to determine an absolute position. Prior art absolute encoders that employ a single track containing both absolute and incremental position information are generally known to be less accurate that those using separate tracks.

An example of a prior art absolute encoder is given in U.S. Pat. No. 5,235,181 entitled: "ABSOLUTE POSITION DETECTOR FOR AN APPARATUS FOR MEASURING LINEAR ANGULAR VALUES." It describes a position detector where the position is detected by reading separate absolute and incremental tracks. The absolute track is made up of pseudo-random distribution of bars spaced to form a continuous sequence of unique binary words, each indicating a distinct value of the absolute position. The arrangement for reading the absolute track comprises a photoemitter light source placed above the track and a linear type charge transfer detectors CCD located beneath the track, such that the pseudo-random absolute track is read through an image enlarging optical lens positioned in between. The incremental track is read through a sensing unit which comprises a photoemitter and a group of four photodetectors arranged 90 degrees apart in order to produce signals in quadrature for interpolating steps in the track. One drawback of the invention is that it employs an older quadrature detection technique that is can be relatively susceptible to errors and limited in resolution. Another disadvantage of this arrangement is that it uses a large number of components that must be accurately aligned and assembled, and the use of separate sensors to read the absolute and incremental tracks respectively further complicates alignment issues. Moreover, it requires the use of optical lenses, which adds to the cost and complexity of the manufacturing process and precludes its use in some relatively small applications.

Another optical encoder device capable of reading both absolute and incremental tracks is described in scientific article entitled: "High-Resolution Optical Position Encoder with Large Mounting Tolerances", by K. Engelhardt and P. Seitz, Applied Optics, 1 May 1997. The described encoder detects the absolute track, containing a pseudo-random bit code, and an incremental track made up of equally spaced lines with a specialized ASIC detector chip. A single light source illuminates both tracks to be imaged onto the detector using a positive plastic lens. The specialized detector is made up of multiple sections of which one section comprises a CCD line sensor that has photosensitive elements for reading a single line to determine the absolute code pattern. The other two sections, used to capture the image of the incremental track, each contain two elements with areas shaped as sine square functions. These sine functions have the same frequency as the image of the incremental pattern. The two elements in each section are shifted 180° and the two sections are shifted 90° relative to each other.

The difference between the photocurrents from the two elements in each section will represent a Fourier coefficient for an expansion of the image of the incremental pattern. The phase shift of 90° between the two sections gives that current from the first section will represent a sine coefficient, $I_{sin}$, and the current from the second section will represent a cosine coefficient, $I_{cos}$. The phase of the Image of the incremental track is then calculated as:

$$\varphi = \arctan\left(\frac{I_{cos}}{I_{sin}}\right),$$

The detector is able to optically calculate a Fourier expansion of the light distribution incremental detection, which enables relatively good resolution. However, a drawback of this configuration is that it is not very flexible i.e. the period of the image of the incremental track must match the spatial frequency of the sinusoidal shape almost exactly or accuracy is lost. This can happen when the disk is jarred causing it to move inadvertently, or by inaccurate disk mounting. This requires the disk be mounted with very little eccentricity and that the sensor must be mounted precisely relative to the disk and the light source. A further disadvantage is that the reference period is fixed by virtue of being embedded in the chip, which cannot change during operation. Moreover, the use of the specialized ASIC detector adds to the overall cost to the encoder and limits production in large quantities.

In view of the foregoing, it is desirable to provide an encoder apparatus and method with high resolution that is relatively less expensive and easier to assemble with fewer components, less sensitive to disk mounting errors, and suitable for applications of small dimensions.

SUMMARY OF THE INVENTION

Briefly described and in accordance with an embodiment and related features of the invention, an apparatus and method in accordance with the present invention is provided. A high-resolution absolute optical encoding apparatus is provided for calculating an absolute position. The encoder comprises an optical disk in rotary encoders or optical scale element in linear encoders in which both incremental and absolute code tracks are embedded thereon. In an embodiment of the invention, a rotary optical encoder comprises a photoemitter light source such as a laser diode that illuminates the incremental and absolute code tracks such that they are imaged onto a CCD area array sensor.

The image is formed onto a pixel matrix having a plurality of rows and columns such that a first detector line is read corresponding to a row of the pixel matrix in the portion of the image comprising the incremental track. Furthermore, a second detector line is read that corresponds to a row in the pixel matrix of the image comprising the absolute track. In the invention, mounting errors due to inaccurate mounting of the disk or scale element cause fluctuations in the reference period of the code tracks that arise from the movement of the disk or scale element are compensated for by maintaining a constant spatial frequency by dynamically changing the row of detector lines read from the image matrix. In another aspect of the invention, compensation is performed by altering the numerical value of the pattern period used in the Fourier phase algorithm. At least some of the numerical processing is performed with a logic circuit such as a Field Programmable Gate Array (FPGA). In the embodiment, at least two light source-area array sensor pairs are positioned 180 degrees apart such that the code tracks are read at two different locations resulting in two different angular calculations, whereby the absolute angular position is based on the mean of the two calculations.

In another aspect of the invention, a Total Station theodolite apparatus for use in topographic surveying includes the invented rotary optical encoder for measuring angular position in the vertical plane and the horizontal plane. The encoder cooperates with a servo-mechanism for automatically tracking a target in what is known as robotic surveying.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

A high-resolution optical encoder described by the present invention largely avoids the disadvantages of the prior art. The invented encoder enables improved reliability and lower cost compared to the prior art by which a simplified design eliminates use of optical enhancement lenses and implements a single light source to image both absolute and incremental tracks onto and a single two-dimensional CCD area array sensor. Furthermore, the invention exhibits improved flexibility by exhibiting less sensitivity to disk mounting errors and is equally suitable for linear or rotary encoder applications.

Figure 1A:
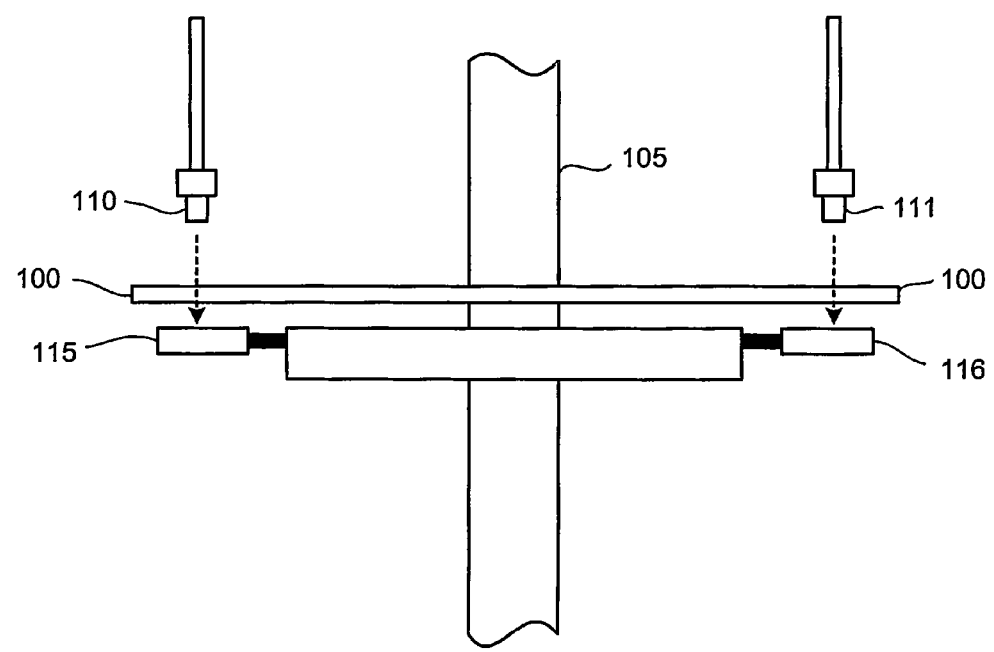
FIG. 1a depicts a simplified side view illustration of the basic components of a rotary optical encoder operating in accordance with a first embodiment of the invention.

FIG. 1a depicts a simplified side view illustration of the basic components of a rotary optical encoder operating in accordance with a first embodiment of the invention. A disk 100 is mounted on a shaft 105 that rotates about the shaft axis in direct relationship with the item being monitored. The disks used in rotary optical encoders are typically composed of a glass, plastic, ceramic, or metal that have coded markings precisely embedded in a track that encircles the outer portion of the disk. The markings are detected by an arrangement comprising a photoemitter light source 110,111 mounted on one side of the disk 100 and photo detectors 115,116 mounted on the other side of the disk. The disk may be of a construction having an opaque background with transparent markings so that the light passing through the transparent markings is detected. Alternatively, the disk can be transparent with opaque markings, in which case the photo detectors detect the interruption of light by the passing markings.

The encoder components are typically protected by a rugged enclosure to shield the light path and electronics from dust and other elements present in hostile industrial environments. In a preferred embodiment, an opaque disk rotates in a manner that allows light to pass through transparent markings, which are detected by the photo detector.

Figure 1B:
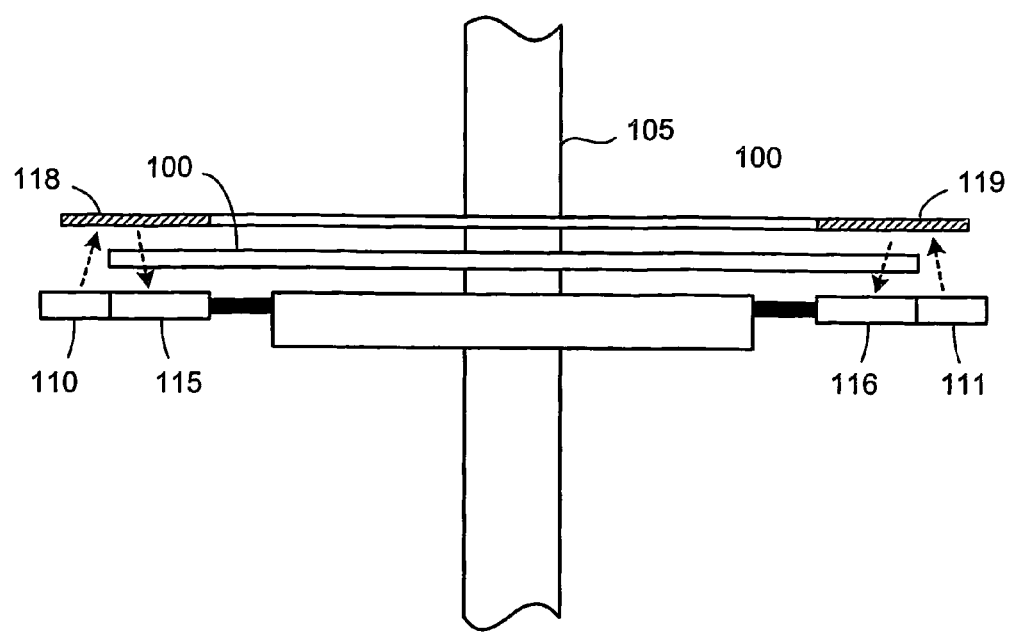
FIG. 1b depicts a side view illustration of a rotary optical encoder operating in accordance with a second embodiment of the invention.

FIG. 1b depicts a side view of a second embodiment of the rotary optical encoder operating in accordance with the invention. The arrangement here is configured so that the photoemitter light source and photo detector (110,115 and 111,116) is proximally located to each other and on the same side of the disk. In fact the laser and the sensor can be incorporated on the same integrated circuit chip, although this is not necessary. In the preferred embodiment, the light source 110,111 is located slightly outside the disk 100 such that the emitted light is reflected by mirror 118,119 through the disk and markings, which are detected by the photo detector 115, 116. It should be noted that the invention is not limited to this configuration and that other configurations are possible such as locating both the light source underneath the disk rather than slightly outside of it or conversely locating the sensor slightly outside the disk instead of the light source, for example.

The photo detectors comprise a single charge-coupled-device (CCD) area array sensor using a high-density grid of pixels for receiving the light from the light source such as an LED or laser diode. The CCD used can be of a variety of array sensors types, however, the sensor implemented in the embodiment is preferably an Interline Transfer (ILT) CCD because of their simple construction and relatively low cost.

ILT CCD area array sensors are well known in the art and are commonly used in digital cameras. They account for a large majority of vision industry products thus the economy of scale typically makes them much less expensive compared to other types of array sensors. Although ILT CCD array sensors do not provide the best image resolution, they make a good choice and function well in detecting coded tracks in optical encoders. By way of example, a CCD array sensor that has been shown to work well with the invention is a sensor from Agilent Technologies of Palo Alto, Calif., U.S.A., model number ADCS-1121, and having 352×288 pixels. Another sensor that has been shown to work satisfactorily is from Hynix Semiconductor of Ichon, Korea, product number HB-7121B and having 402×300 pixels.

Figure 2:
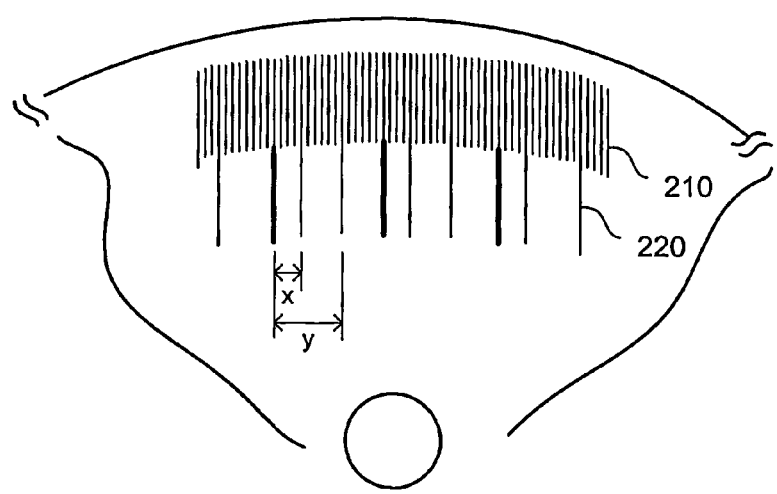
FIG. 2 is an illustration of a partial section of the encoder disk used in the embodiment of the present invention.

Referring now to FIG. 2, an illustration of an exemplary coding technique used in the embodiment of the present invention for detecting the absolute position is shown on a partial section of a disk. The incremental track pattern is comprised of equally spaced markings in radial distribution encircling just inside the outer circumference of the disk, as indicated by reference numeral 210.

The absolute track 220 is made up of markings that consist of a series of coded lines that include broad and narrow lines radially distributed underneath the incremental track. The absolute track comprises 156 broad lines that divide the track into 156 equally sized sections. Each broad line serves as a synchronization line or reference line for each section. Contained within each section are two narrow data lines that carry information about the section number or absolute position. By way of example, the position can be determined by reading the distance x to the right from the synchronization line to the first data line, whereby this distance represents the first digit of the angular position. Similarly, the distance y of the second data line from the synchronization line represents the second digit of the angular position. The spatial distance can be measured by counting the markings of the incremental track. The distances are captured from the sensor images in number of pixels between the synchronization and data lines. However, the distance is expressed in the number of positions in the incremental code, where a position can be either a line or a opening in the incremental code. By way of example, the width of a line marking in the incremental code is calculated as the distance between two synchronization lines divided by 36. The distance between the synchronization and data lines is then scaled with this factor to get the distance in positions of the incremental code. Those skilled in the art will appreciate that the coding scheme described in the embodiment is exemplary by which the invention is not limited to, and that any suitable coding pattern can be used that enables the absolute position to be uniquely and unambiguously detected.

Figure 3:
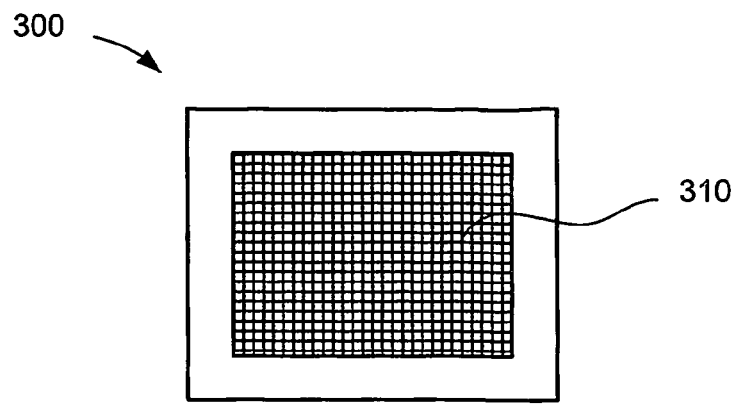
FIG. 3 depicts an exemplary CCD area array sensor 300 used in the embodiment of the invention.

FIG. 3 depicts an exemplary CCD array sensor 300 of the embodiment that is capable of capturing an image (or individual lines) containing both the incremental and absolute tracks in single "snapshot." The imaging area 310 of the array is a silicon based IC comprising a dense matrix of photodiodes or pixel elements that captures the image by converting the incident light from the tracks into an electric charge which is then processed into and electrical signals. It should be noted that other mainstream sensor array technologies are suitable for use with the invention such as Complementary Metal Oxide Semiconductor or CMOS sensors, which consist of an array of CMOS pixels of photosensitive elements. The image captured by the array sensor is divided into a top and bottom portion whereby the top portion contains image of the incremental track. Likewise, the bottom portion contains the image of at least one complete section of the absolute track. The area array sensor is sufficiently sensitive and positioned close enough to the disk to be able to capture the images without the need for optical lenses.

Figure 4:
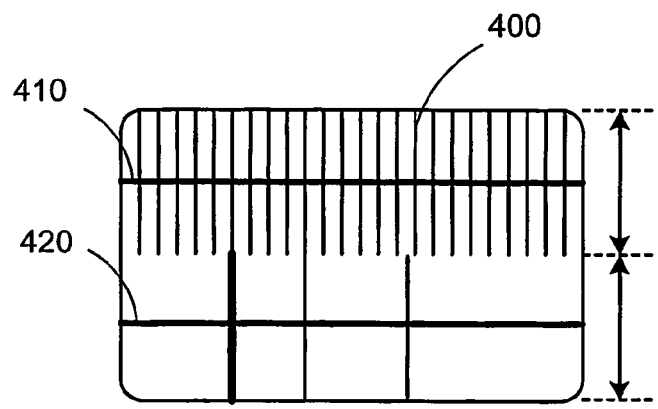
FIG. 4 illustrates an area array sensor image of the incremental and absolute tracks.

FIG. 4 illustrates a captured image that includes both the incremental and absolute tracks. The tracks are read by a pair of image detector lines, one line (410) spans across the top portion of the image that comprises an image of the incremental track, and another line (420) spanning across the bottom portion comprising the image of the absolute track. The detector line (420) comprising the image of the absolute track is preprocessed with a very fast logic circuit such as a Field Programmable Gate Array (FPGA). FPGAs are widely used programmable devices that provide fast processing in hardware combined with the ability to be reconfigured for a wide variety of applications. Detecting the presence of a synchronization line or data line is performed by detecting the intensity change by which it rises above and drops below a predefined intensity threshold value, which is used to determine where the peaks start and where they end. The identification is preformed by using a sum of the pixel intensities from the edge-to-edge of the imaged marking and comparing the sums with a discrimination threshold. Once a peak is detected, the discrimination threshold is used to discriminate and determine whether the peak is a synchronization line or a data line.

Figure 5:
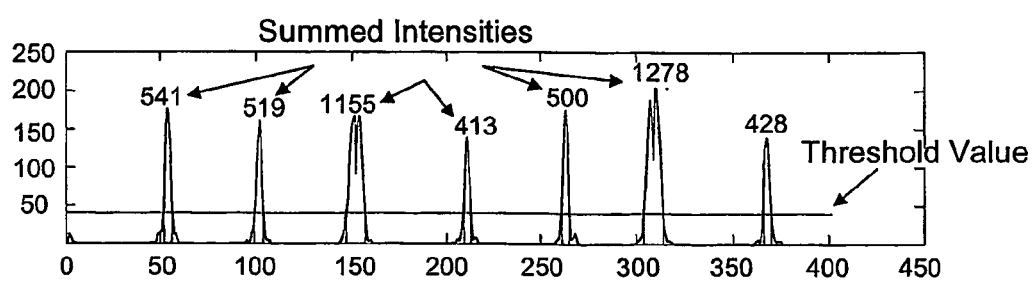
FIG. 5 shows an image of an exemplary sensor line from the absolute code.

FIG. 5 shows an image of an exemplary sensor line from the absolute code. In the example a intensity threshold value of 40 is used to detect the beginning and the end of the peaks. The pixel values are summed from the beginning of the peak to the end, as shown by the shaded area on each peak. In this case, the summed intensities are [541, 519, 1155, 413, 500, 1278, 428], as can be seen in the image. To determine which peaks are from data lines and which are from synchronization lines, the summed intensities are compared to the discrimination threshold value, which in this case is chosen to be 800. Hence, by this criteria peak numbers 3 and 6 are synchronization lines while peaks 1, 2, 4, 5 and 7 are data lines.

The center positions of the lines and the summed intensities are passed from the FPGA to a processor to calculate the absolute position. By way of example, an example of a processor that has shown to work well with the invention is ARM-processor referred to as AT91M42800A-33AI.

The section numbers are calculated from the distance from the synchronization line to the first and the second data lines. Once the section number is determined the exact angular positions of synchronization lines and the data lines can be calculated. Using the known position of the lines, a rough estimate of the angular position can be calculated. The rough angle estimate is accurate enough to determine the position down to one period of the incremental track. The image from the incremental track is analyzed using a numerical Fourier method in which the FPGA performs the majority of the calculations and the processor calculates the absolute angle.

Figure 6:
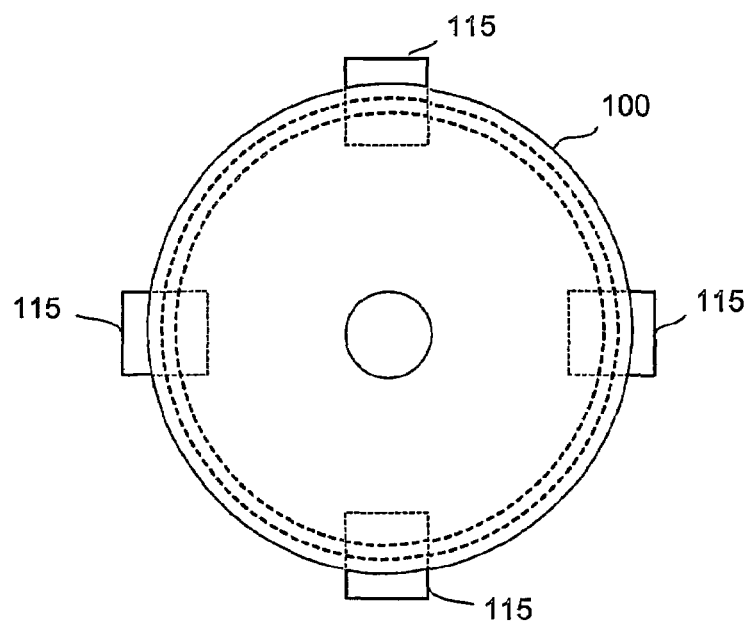
FIG. 6 is a diagrammatic top view of the relative positions of the area array sensors with respect to the rotary encoder disk in the embodiment.

FIG. 6 is a diagrammatic top view of the encoder disk showing the relative positions of the area array sensors used in the embodiment. The array sensors are shifted 180 degrees apart in a configuration that enables both tracks to be read at two separate positions resulting in two distinct angles. The two angles help to make the absolute optical encoder insensitive to mounting errors since the resulting angular position measured by the encoder is given by mean value of the two angles. Therefore, first order errors effectively get cancelled out for motion along the path, because the mean is inherently invariant to disk movements. Several kinds of mounting errors will give rise to errors in the read angle. To increase the accuracy and keep the costs low by lowering the precision required for mounting the disk, it is desirable to compensate for as many mounting errors as possible. For example, if the area-sensor is mounted with a rotational error in the plane of the encoder disk the angle measured will change if the line used on the sensor is changed. Fortunately, if the tilt angle is known it is very easy to compensate for this error. This can be done by reading several lines at a time, while keeping the angular position unchanged, and determine the angular position for them all. If the angular position is the same for all the lines the sensor is mounted correctly, if not the sensor is mounted with an error that can be calculated from the varying angular positions and used to compensate the angle as the used line is changed.

The design with two source-detector pairs placed 180° apart has the beneficial characteristic in that all errors due to translation of the disk are effectively canceled. However, mounting errors could cause the two source-detector pairs to be placed at not exactly 180° apart. Some of these errors can be compensated for if the actual angular distance between the two source-detector pairs is known. This distance can be calculated by subtracting the angle read on the two sensors. Although two source-detector pairs are described in the preferred embodiments, it should be noted that the invention is not limited to this configuration and that it is possible to implement a single source-detector pair or even three or more source-detector pairs to work with the invention.

The outer track containing the high-resolution incremental code is imaged and the data is sent to the FPGA for preprocessing to calculate the resolution.

Figure 7A:
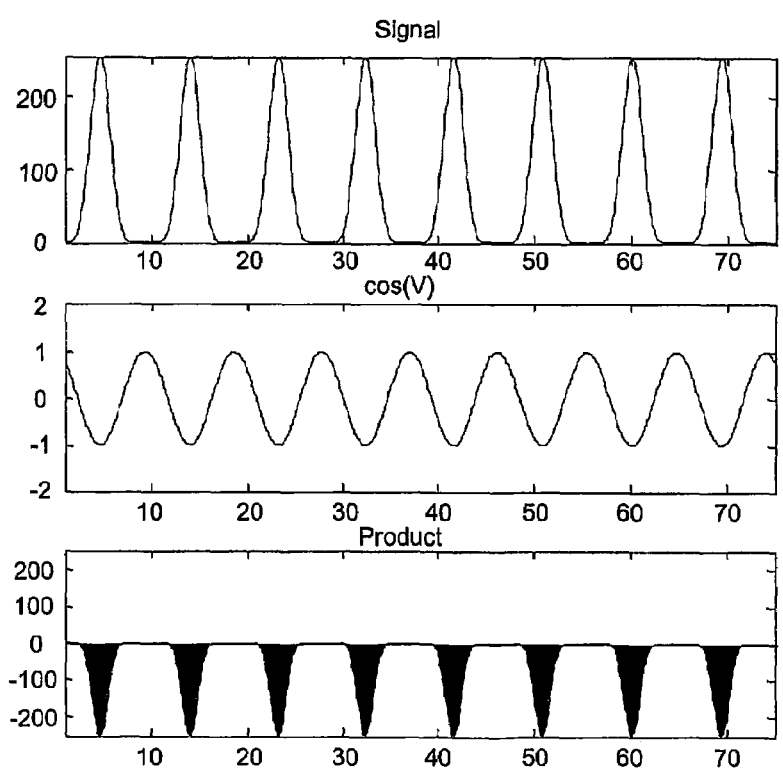
FIGS. 7a and 7b illustrates graphically the numerical calculation method.
Figure 7B:
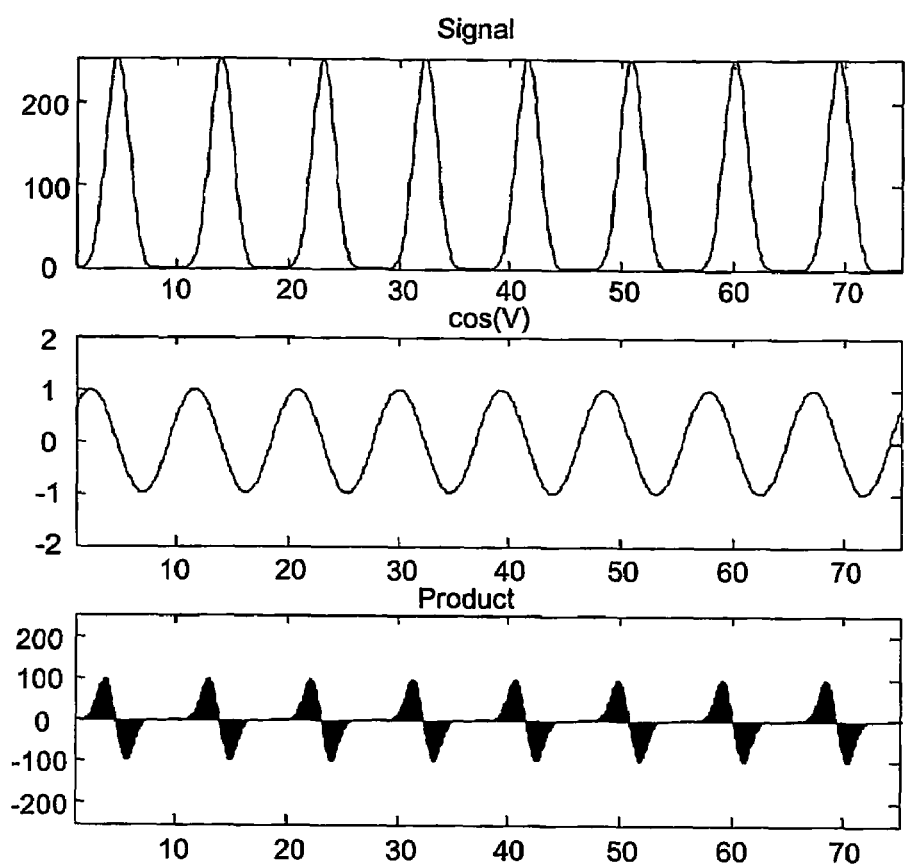

FIG. 7a illustrates graphically the numerical Fourier method carried out by the FPGA. The output signal read from the disk by the array sensor is digitized and depicted by the top signal shown. The product of the digitized output signal and a digitized cosine signal cos(V) (middle signal) is depicted by the bottom signal. Each result is summed in calculations performed by the FPGA. Likewise FIG. 7b illustrates the product of the signal with a sin(V) signal. Since any sinusoidal function can be written as, $$A \sin(x+\phi) = B \sin(x) + C \cos(x)$$

both the amplitude information A and the phase information $\phi$ from the left side of the equation can be represented by the two coefficients B and C on the right side of the equation. The relationship between the two ways to write the sine function is:

$$\varphi = \arctan\left(\frac{C}{B}\right) \text{ and, } A = \sqrt{B^2 + C^2}$$

This implies that if we can approximate our signal with the form $B \sin(x) + C \cos(x)$, the phase can be calculated as the arc tan(C/B). This approximation is found by using Fourier mathematics. The Fourier expansion of a periodic function $f(x)$ with period T is written as:

$$f(x) = \frac{a_0}{2} + \sum_{n=1}^{\infty}\left(a_n \cos\frac{n2\pi x}{T} + b_n \sin\frac{n2\pi x}{T}\right)$$

where $a_n$ and $b_n$ is calculated as:

$$a_n = \frac{2}{T}\int_a^{a+T} f(x) \cdot \cos\frac{n2\pi x}{T} dx$$

$$b_n = \frac{2}{T}\int_a^{a+T} f(x) \cdot \sin\frac{n2\pi x}{T} dx$$

where the coefficient $a_0$ is the mean value of $f(x)$. The two first order coefficients, $a_1$ and $b_1$, gives a sine approximation of $f(x)$ and the higher order coefficients gives a more exact form of $f(x)$. If we could calculate the two first order coefficients of our signal we could calculate its phase as arc tan($a_1/b_1$). According to the expressions for $a_n$ and $b_n$, they are calculated using only one period of the signal. However the signal is not exactly periodic and we want to use all the information in the signal. Therefore it is possible to modify the expressions to:

$$a_n = \frac{2}{Tm}\int_a^{a+mT} f(x) \cdot \cos\frac{n2\pi x}{T} dx$$

$$b_n = \frac{2}{Tm}\int_a^{a+mT} f(x) \cdot \sin\frac{n2\pi x}{T} dx$$

where m is the number of periods used, i.e. (number of pixels)/(period of pattern). This means that we integrate over several periods of the signal. In our case $f(x)$ is not continuous but discrete, $f_j$ is the value of pixel number j, thus the integrals are therefore replaced with sums over the pixels:

$$a_n = \frac{2}{Tm}\sum_{j=1}^{N} f_j \cdot \cos\frac{n2\pi x_j}{T} \Delta x_j$$

$$b_n = \frac{2}{Tm}\sum_{j=1}^{N} f_j \cdot \sin\frac{n2\pi x_j}{T} \Delta x_j$$

where N is the total number of pixels and $\Delta x_j$ is the width of each pixel. We are only interested in the first order coefficients i.e. n=1, and furthermore it is only the ratio between them that is of interest, everything else that is common to both expressions is canceled. Moreover, $x_j$ is simply the pixel number which can be replaced with j resulting in:

$$a_1 = \sum_{j=1}^{N} f_j \cdot \cos\frac{2\pi j}{T}$$

$$b_1 = \sum_{j=1}^{N} f_j \cdot \sin\frac{2\pi j}{T}$$

where finally the phase is calculated as arc tan($a_1/b_1$).

The absolute angle $\omega_a$ is read from the code of the inner track in the manner previously outlined. The processor then calculates the final angular position $\omega_f$, $$\omega_f = \text{round}\left(\frac{\omega_a \cdot N_{sect} - \arctan(C/S)}{2\pi}\right) \cdot \frac{2\pi}{N_{sect}} + \frac{\arctan(C/S)}{N_{sect}}$$

where $N_{sect}$ is the total number of periods in the incremental track. In the present invention the incremental track contains 2808 periods. The round operation indicates that the number should be rounded to the closest integer.

The accuracy of calculations is down to approximately 1 microradian for the final position. Improving the accuracy depends largely on the amount of available processor power that can perform the calculations within a reasonable time.

The method of the present invention is rather flexible in comparison with the prior art, with respect to the accuracy needed to mount the disk in the encoder. By way of example, if the disk is not precisely mounted the tracks will shift or wobble slightly as the disk rotates which can result in misalignments in pitch, roll, yaw and other types of errors. The method enables the encoder to detect and compensate for small mounting errors thereby allowing for larger mounting errors than in the prior art. The compensation is possible because the Fourier analysis is performed numerically thus allowing the encoder to dynamically change the period of the references in contrast to the spatial frequency being fixed in the detector chip which cannot be changed during operation.

The encoder can adapt to and compensate for a fluctuating pattern period due to inaccurate mounting of the disk. Compensation can be applied by using either one of two techniques. The first technique is to dynamically change the detector line of the incremental track image. If the pattern period changes due to a spatial movement of the disk, the used line is shifted so that it always contains an image with the same pattern period. The second option is to alter the numerical value of the pattern period used in the Fourier phase algorithm. In the preferred embodiment, the first technique is applied to dynamically change the detector line since altering the spatial frequency numerically can require a large amount of processing power. However, if the alternative with changing the lines is chosen, the sine and cosine values used in the sums in the Fourier phase algorithm can be generated in advance and stored in a table in memory. If the period in the calculations is changed, new sine and cosine values must be generated each time the period changes. Furthermore, some pattern periods tend to give better accuracy than others, for example, when exactly a whole number of periods is contained within the width of the detector. By changing the line it is possible to select a favorable pattern period to use in the calculations that may somewhat reduce the processing requirements.

Figure 8:
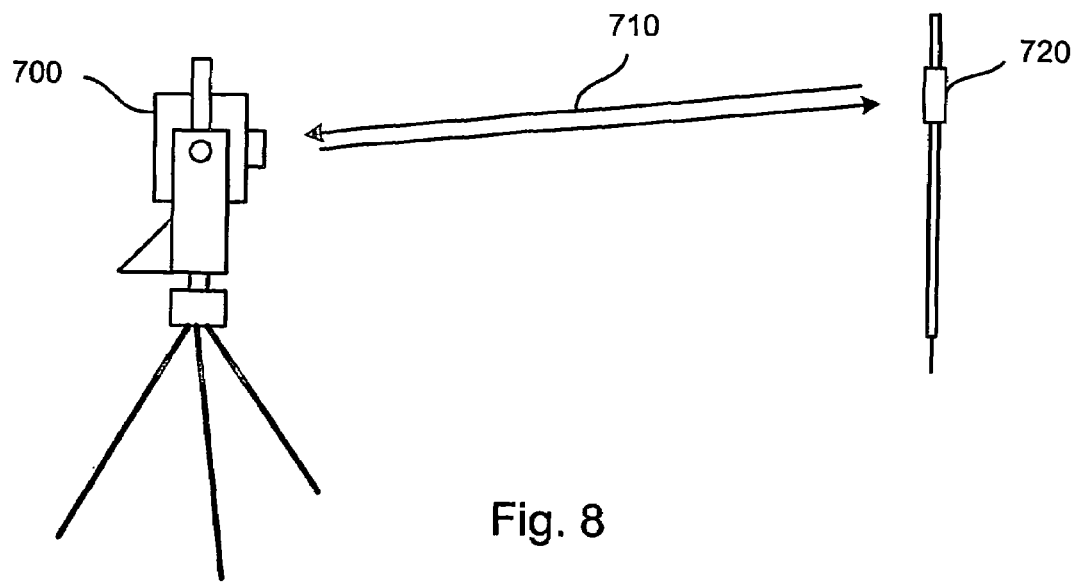
FIG. 8 shows an exemplary Total Station land surveying instrument operating in accordance with the present invention.

The present invention contemplates a high-resolution optical encoder that is less sensitive to disk mounting errors and requiring no optics makes it especially suitable for applications where a small encoder profile and simple construction would be advantageous. By way of example, theodolite devices used for carrying out topographic mapping such as land surveying employ optical encoders for the precise measurement of vertical and horizontal angular positions. Shown in FIG. 8, the devices are also referred to as Total Stations 700 to those skilled the art and are capable of electronic distance measurement (EDM) for precisely measuring distances, in addition to angular displacement. Precise distance measurements are performed with a laser that transmits an infra-red frequency modulated signal 710 on a light wave to a retro-directive prism pole reflector 720 to return the signal, where the phase difference between the transmitted and received signal is used to calculate the distance. The Total Station instrument 700 is configured so it can pivot up and down and swivel horizontally in order to make precise angular measurements in the vertical and horizontal planes.

Figure 9:
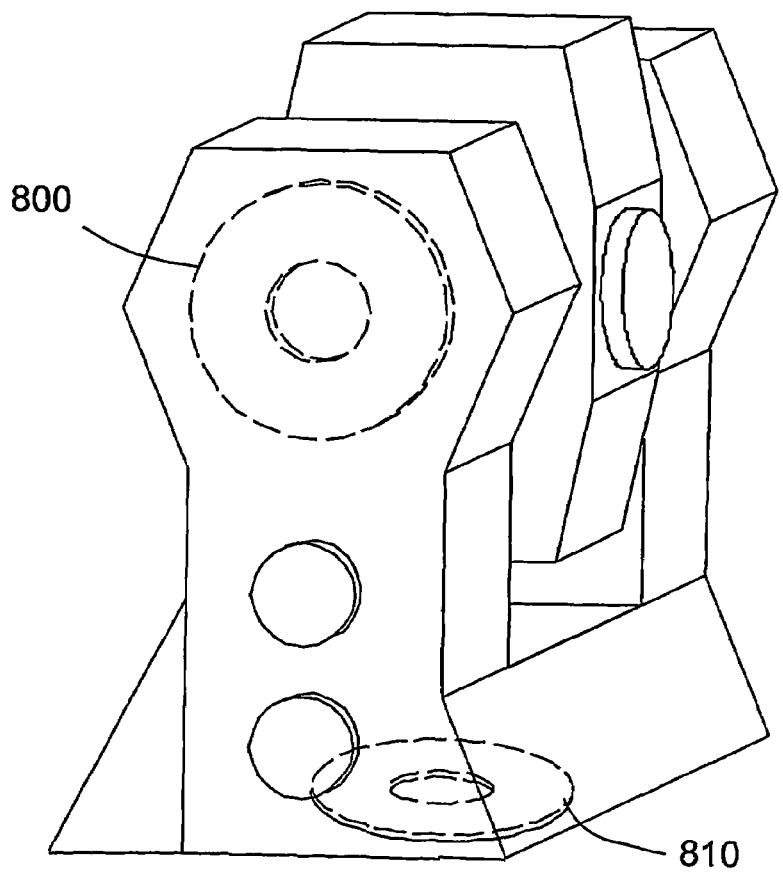
FIG. 9 is a diagrammatic side view of the of Total Station surveying instrument.

FIG. 9 is a diagrammatic side view of the main body of the Total Station instrument 700 illustrating the locations of the optical encoder disks 800, 810 for measuring angular displacement in the vertical plane when the main body pivots up and down and in the horizontal plane from swiveling side-to-side. Advanced instruments such as the 5600 series of Total Stations manufactured by Trimble AB of Sweden offer features such as a servo-driven capability and automatic search that allows the instrument to automatically follow a target as it is moved. Other advanced features include radio telemetry for communication with the prism reflector and active targets to eliminate the risk of false reflections that may be mistakenly accepted by the instrument. The encoders enable active and precise control of the servo mechanisms in what is known in the art as Auto Tracking Surveying or Robotic Surveying.

Figure 10:
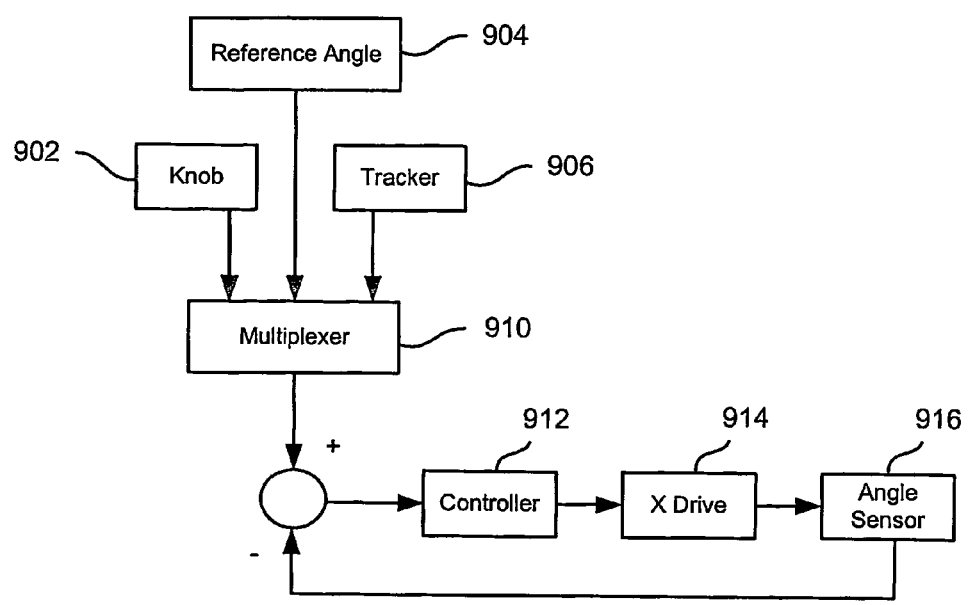
FIG. 10 shows a functional block diagram of a servo-driven Total Station operating in accordance with the invention.

FIG. 10 shows a functional block diagram of how a servo-driven Total Station, capable of auto tracking a target, is implemented with the optical encoder of the present invention. Since the instrument is capable of operating in several different modes, input from the modes are individually selected for use in the servo-loop by a multiplexer 910. The output of the multiplexer 910 is fed into servo loop which comprises a controller 912, a Drive, 914, and an Angular sensor 916. The controller makes the suitable analyses and determines how the drive is to be moved. The angular sensor or encoder of the present invention detects the position of the axis and feeds it back to be compared with the input angle.

The function of the servo loop is to position the axis driven by the Drive 914 to a certain position given on the input. The input angle can be different when the instrument is used in different modes. For instance, when used normally the control knobs 902 are used primarily to operate the instrument. When the user wants to change the vertical or the horizontal angle, he turns the control knob for the vertical or the horizontal axis respectively. This means that the input angle to the servo system is changed in relation to the movement of the knobs. In another mode, the instrument can be used for outputting certain positions e.g. the corners of a building that is to be built. In this case the position is typed on the control unit and the input angle corresponding to that position is calculated, this is referred to as the reference angle 904. In yet another mode, the instrument can be used to automatically track a target. In this case the tracker unit 906 detects the movements of the target and changes the input angle to the servo loop so that the instrument tracks the movements of the target.

When initially starting up the encoder, both of the tracks are read to calculate the exact absolute angle. When the absolute angle is known it is not necessary to calculate the absolute angle from the absolute track. Instead, the encoder can be used in an incremental mode where only the incremental track is read. When a new incremental angle is read from the incremental track, the new absolute angle can be calculated from the last absolute angle and knowledge about the rotation speed of the axis.

If the two last absolute angular positions where $\omega_{k-2}$ and $\omega_{k-1}$ and the new incremental angle is $\omega_{inc}$ then the new absolute angular position, $\omega_k$, can be calculated as, $$\omega_k = \text{round}\left(\frac{(\omega_{k-1} + \Delta\omega_{k-1}) \cdot N_{sect} - \omega_{inc}}{2\pi}\right) \cdot \frac{2\pi}{N_{sect}} + \frac{\omega_{inc}}{N_{sect}}$$

where $\Delta\omega_{k-1} = \omega_{k-1} - \omega_{k-2}$

This is similar to the way the absolute and incremental angle from the two tracks is forged together. However, the absolute angle does not come from reading the absolute track but from assuming that the absolute angle is the last known absolute angle plus the last known angular change. It has been found that this assumption is usually correct enough as long as the angular acceleration is not too large. Laboratory analyses have shown that the instrument must be struck very hard to achieve this kind of acceleration. Notwithstanding, subjecting the instrument to forces that are likely to make it lose track of the absolute angle are likely to cause severe damage to the instrument. A primary advantage with this is that the calculation of the absolute angle from the absolute track does not have to be a priority task in the controller. Therefore, the absolute angles do not need to be calculated at the same high rate as with the incremental angles. In the embodiment, when an absolute angle is calculated from the absolute track, it is compared with the angle calculated in the incremental mode as described above to check that the encoder has not lost track of the absolute angle.

The foregoing description of the preferred embodiments of the invention has been presented for purposes of illustration and description. It is not intended to be exhaustive or to limit the invention to the precise forms disclosed, since many modifications or variations thereof are possible in light of the above teaching. For example, inventive concept is suitable for use in both rotary and linear encoders using a scale element in place of a disk. Furthermore, the invention applicable to sensor configurations other than those described in the preferred embodiments, for example, configurations of three sensors, four sensors positioned 90 degrees apart, or more than four sensors etc.

Still other modifications will occur to those of ordinary skill in the art. All such modifications and variations are within the scope of the invention. The embodiments chosen were described in order best to explain the principles of the invention and its practical application, thereby enabling those skilled in the art to utilize the invention in various embodiments and with various modifications as suitable for the particular use contemplated. It is therefore the intention that the following claims not be given a restrictive interpretation but should be viewed to encompass variations and modifications that are derived from the inventive subject matter disclosed.

The invention claimed is:

1. An absolute position rotary encoding apparatus comprising:
   a disk having a first code track and a second code track formed on said disk;
   a light source for illuminating said code tracks;
   a first area array sensor, comprising a pixel matrix having a plurality of rows, configured to receive the light illuminating said code tracks for forming an imaged pattern of a portion of said first and second code tracks simultaneously, the first array sensor being:
   adapted to read a first detector line corresponding to a row in the pixel matrix comprising the imaged pattern of the first code track and a second detector line corresponding to a row in the pixel matrix comprising the imaged pattern of the second code track; and
   a Field Programmable Gate Array (FPGA)/processor adapted to
   compensate for fluctuations in the code tracks, resulting from the disk being inaccurately mounted, by dynamically shifting at least one of said detector lines on the first area array sensor being read, corresponding to a radial shift along a code track on said disk, such that a period length of the imaged pattern along said at least one detector line remains constant; and
   numerically calculate an absolute position based on a light distribution of the imaged patterns of incremental and absolute code tracks from the disk.

2. An encoding apparatus according to claim 1, wherein the disk is an optical disk suitable for use in a rotary encoder and the first code track represents the incremental track and the second code track represents the absolute track.

3. An encoding apparatus according to claim 2, further comprising a second area array sensor, wherein the first area array sensor and the second area array sensor are positioned 180 degrees apart with respect to the optical disk, such that the incremental and absolute code tracks are read at two different locations resulting in two different angular positions, and wherein the absolute position is based on the mean of the angular positions.

4. An encoding apparatus according to claim 2, wherein the incremental track is comprised of a plurality of equally spaced and radially distributed markings near the outer edge of the disk, and wherein the absolute track is comprised of markings that form a series of coded lines that include broad and narrow lines radially distributed inside the incremental track such that the broad lines divide the track into equally sized sections and within each section are two narrow data lines that carry information about absolute position.

5. An encoding apparatus according to claim 3, further comprising third and fourth area array sensors positioned 90 degrees apart with respect to the optical disk, such that the incremental and absolute code tracks are read at four different locations.

6. An encoding apparatus according to claim 1, wherein said light source is a photoemitter including at least one of an LED, laser diode, and an incandescent light source.

7. An encoding apparatus according to claim 1, wherein the first area array sensor is constructed of one of a CCD or a CMOS photodiode technology.

8. An encoding apparatus according to claim 1, wherein said light source and said first area array sensor are proximally located on a first side of the disk and a mirror located on a second side, whereby light emitted from the light source is reflected by the mirror through the disk to illuminate the code tracks for reception by the first area array sensor.

9. An encoding apparatus according to claim 1, wherein the FPGA is configured to numerically calculate phase intensity distribution, spatial frequency and a phase angle of the imaged pattern of the code tracks.

10. A Total Station theodolite apparatus used for topographic surveying and mapping includes an optical encoder for measuring angular position in the vertical plane and the horizontal plane and cooperates with a servo-mechanism for automatically tracking a target, said encoder comprising:
    an optical disk having an incremental code track and an absolute code track formed thereon;
    a photoemitter light source for illuminating said code tracks;
    a first area array sensor, comprising a pixel matrix having a plurality of rows, configured to receive the light illuminating said code tracks for forming an imaged pattern of a portion of said incremental and absolute code tracks simultaneously, the first array sensor being
    adapted to read a first detector line corresponding to a row in the pixel matrix comprising imaged pattern of the first code track and a second detector line corresponding to a row in the pixel matrix comprising the imaged pattern of the second code track; and
    a Field Programmable Gate Array (FPGA)/processor adapted to
    compensate for fluctuations in the code tracks, resulting from the disk being inaccurately mounted, by dynamically shifting at least one of said detector lines on the area array sensor being read, corresponding to a radial shift along a code track on said disk, such that a period length of the imaged pattern along said at least one detector line remains constant; and
    numerically calculate an absolute position based on a light distribution of the imaged patterns of incremental and absolute code tracks from the disk; and
    calculate topographic data and tracking information about the target.

11. A Total Station apparatus according to claim 10, wherein the optical disk is one of opaque with transparent markings defining the incremental and absolute code and a transparent disk with opaque markings defining the incremental and absolute code tracks.

12. A Total Station apparatus according to claim 10, wherein the photoemitter light source is at least one of an LED, laser diode, and an incandescent light source and the first area array sensor is an Interline Transfer (ILT) CCD area array sensor.

13. A Total Station apparatus according to claim 10, wherein for the FPGA is configured to numerically calculate phase intensity distribution, spatial frequency and a phase angle of the imaged pattern of the code tracks.

14. A Total Station apparatus according to claim 10, further comprising a second area array sensor, wherein the first area array sensor and the second area array sensor are positioned 180 degrees apart with respect to the optical disk, such that the incremental and absolute code tracks are read at two different locations resulting in two different angular positions, and wherein the absolute position is based on the mean of the angular positions.

15. A Total Station apparatus according to claim 10, wherein the incremental track is comprised of a plurality of equally spaced and radially distributed markings near an outer edge of the disk, and wherein the absolute track is comprised of markings that form a series of coded lines that include broad and narrow lines radially distributed inside the incremental track such that the broad lines divide the track into equally sized sections and within each section are two narrow data lines that carry information about absolute position.

16. A Total Station apparatus according to claim 10, further comprising a processor for calculating the topographic data and a controller for operating the automatic tracking servo-mechanism.

17. A method of calculating an absolute position with an optical rotary encoder device comprising:
illuminating with a light source an incremental code track and an absolute code track formed on a disk;
imaging a segment of the incremental and absolute code tracks onto a first CCD or CMOS area array sensor for forming an imaged pattern of the code tracks, said area array sensor comprising a pixel matrix having a plurality of rows;
reading a first detector line corresponding to a row in the pixel matrix comprising the imaged pattern of the incremental code track;
reading a second detector line corresponding to a row in the matrix comprising the imaged pattern of the absolute code track;
compensating for fluctuations in the code tracks, resulting from inaccurate mounting of the disk, by selecting suitable first and second detector lines such that a period length of the imaged pattern of the code tracks along the detector lines remains constant; and
calculating numerically the absolute position based on light distribution of the imaged patterns of the incremental and absolute code tracks.

18. The method according to claim 17, wherein the incremental and absolute code tracks are imaged also onto a second CCD or CMOS area array sensor, where the first and second area array sensors are positioned 180 degrees apart with respect to the optical disk, such that the incremental and absolute code tracks are imaged at two different locations resulting in two different angular positions, and wherein the absolute position is based on the mean of the angular positions.

19. The method according to claim 18, wherein said light source and said first and second area array sensors are proximally located on a first side of the disk and a mirror located on a second side, whereby emitted light is reflected by the mirror through the disk to illuminate the code tracks for reception by the first and second area array sensors.

20. The method according to claim 17, wherein the compensating dynamically changes the detector line of the incremental track image when a pattern period changes due to spatial movement of the disk, so that the detector line is shifted in order for a period length of the imaged pattern along said detector line of the incremental track image to remain constant.

21. The method according to claim 17, wherein the compensating includes altering a numerical value of the pattern period used in a Fourier phase algorithm to match spatial frequency of fluctuating tracks.

22. The method according to claim 17, wherein at least a Field Programmable Gate Array (FPGA) performs at least a portion of the numerical calculations.

23. The method according to claim 17, wherein the incremental and absolute code tracks are imaged also onto third and fourth CCD or CMOS area array sensors, where the first through fourth area array sensors are positioned 90 degrees apart with respect to the disk, such that the incremental and absolute code tracks are read at four different locations.

* * * * *